United States Patent [19]

de Haan

[11] Patent Number: 4,698,665
[45] Date of Patent: Oct. 6, 1987

[54] COLOR TELEVISION TRANSMISSION OR INFORMATION STORAGE SYSTEM, RESPECTIVELY WITH TIME-DIVISION MULTIPLEX CODING AND DATA GENERATOR AND RECEIVER SUITABLE THEREFOR

[75] Inventor: Gerard de Haan, Eindhoven, Netherlands

[73] Assignee: U.S. Philips Corporation, New York, N.Y.

[21] Appl. No.: 810,441

[22] Filed: Dec. 17, 1985

[30] Foreign Application Priority Data

Dec. 24, 1984 [NL]  Netherlands ................. 8403929

[51] Int. Cl.$^4$ ........................................ H04N 11/06
[52] U.S. Cl. .................................. 358/12; 358/13
[58] Field of Search ........................... 358/12, 13

[56] References Cited

U.S. PATENT DOCUMENTS 4,516,150  5/1985  Gurley .................................. 358/13
4,533,936  8/1985  Tiemann ............................. 358/12

*Primary Examiner*—Michael A. Masinick

*Attorney, Agent, or Firm*—Thomas A. Briody; William J. Streeter; Gregory P. Gadson

[57] ABSTRACT

Color television transmission or information storage system, respectively using time-division multiplex coding. A signal source is coupled via an encoding circuit for time-division multiplex coding to a transmission or storage channel, respectively, to which a data receiver incorporating a decoding circuit is connected. During a field period of the time-division multiplex encoded signal a first linear combination of the luminance information components of two consecutive lines of a field of the signal from the signal source and the luminance information components of two consecutive lines of the subsequent field of said signal which, on display, substantially coincide with the first-mentioned lines, is conveyed. During the subsequent field period of the time-division multiplex encoded signal a similar, second linear combination differing from the first combination is conveyed. The time ratio for signal compression or expansion, respectively of the first linear combination differs from the corresponding ratio of the second linear combination.

18 Claims, 10 Drawing Figures

COLOR TELEVISION TRANSMISSION OR INFORMATION STORAGE SYSTEM, RESPECTIVELY WITH TIME-DIVISION MULTIPLEX CODING AND DATA GENERATOR AND RECEIVER SUITABLE THEREFOR

BACKGROUND OF THE INVENTION

The invention relates to a color television transmission or information storage system, respectively, with time-division multiplex coding, the system comprising at least one data generator, at least one data receiver and a transmission or information storage channel, respectively, between the generator and the receciver, the data generator comprising at least one signal source for producing signals containing luminance, chrominance, synchronizing and identification information and an encoding circuit for time-division multiplex coding of at least a portion of said signals, which may have been subjected to a change in their time duration, the encoding circuit having an output for supplying a time-division multiplex encoded signal for transmission via the transmission channel or storage in the information storage channel, respectively, the data receiver incorporating a decoding circuit coupled to said channel and, associated with said encoding circuit, being suitable for producing signals comprising at least luminance and chrominance information which predominantly corresponds to the information produced by the signal source in the data generator, in the color television signal an image being formed from two or more fields having a predetermined number of lines. The invention also relates to a data generator and a data receiver suitable therefor.

Such a system for, more specifically, transmission is disclosed in a public report "Experimental and Development Report 118/82", published by the British "Independent Broadcasting Authority", (I.B.A.), entitled "MAC: A Television System for High-Quality Satellite Broadcasting". The report describes several variations for a MAC (Multiplexed Analog Component) picture coding. For all the variations it holds that in the data generator which constitutes the transmitter, the luminance and chrominance information are each submitted to a change in the time duration, namely a time compression, the change for the chrominance information being twice as large as the change for the luminance information. Of the chrominance information, which comprises two components per line period, one of these two components alternately occurs, time-compressed, in the time-division multiplex encoded signal. This signal contains the time-compressed luminance information associated with each line period. The picture information of each line period in the time-division multiplex encoded signal is sequentially assembled from the time-compressed luminance information and one of the two associated time-compressed chrominance information components.

In the receiver the time-division multiplex encoded signal is derived from the signal received via the transmission channel, more specifically the satellite link, and is applied to the associated decoding circuit which, with the aid of the synchronizing and identification information repeatedly produces a time decompression or expansion for the luminance and the chrominance information for the subsequent line period.

In the transmission channel, which is here, by way of example, a satellite link, there is only a limited bandwidth for the picture information transmission. Depending on the proposed variation, the report mentions bandwidths of 8.4 MHz, 7.4 MHz and 6.0 MHz. A time compression factor of ⅔ is proposed for the luminance information for the 8.4 MHz transmission channel bandwidth, so that a bandwidth of 5.6 MHz results for the bandwidth of the non-compressed luminance information. For the available picture information channel widths of 7.5 and 6.0 MHz a luminance compression factor of ¾ is proposed, which results in values of 5.6 MHz and 4.5 MHz for the bandwidths of the non-compressed luminance information components. It was found that for the suggested variations, in view of the limited transmission channel bandwidth and the suggested structure of the time-division multiplex encoded signal to be transmitted, frequency limitations of the luminance and chrominance information are necessary.

The foregoing the description was based, by way of example, on a transmission channel in the form of a satellite link. The frequency limitations described for the transmission of information with the limited bandwidth also prevail for an information storage channel of limited bandwidth. Such a storage channel comprises information storage and display equipment such as, for example, tape and record pick-up and display devices.

The above-mentioned report describes variants of the MAC system in which time-division multiplex coding at the field frequency is applied. In one variant only the luminance information is transmitted during a number of line periods in the field period, while during further line periods only the associated time-compressed chrominance information components are transmitted. In this situation the said further line periods can be divided into two groups, one of the two chrominance information components being supplied during the first group, while the other chrominance information is supplied during the second group of line periods. The first group may occur at the beginning of the field period, whereafter the line periods containing the luminance information and thereafter the second group of line periods containing the chrominance information occur.

In still further variants one of the two chrominance information components is supplied during a number of line periods. During the line period subsequent thereto, the picture information of each line period is sequentially formed from the other chrominance information and the luminance information. Said three information components are then time-compressed. In addition, the transitions between the different types of information and consequently the time-compression factors may be variable.

SUMMARY OF THE INVENTION

The invention has for its object to provide a color television transmission or information storage system, respectively, using time-division multiplex coding, in which using simple signal processing operations a larger number of picture elements can be transmitted than is possible with the existing propositions. To that end, according to the invention, a color television system is characterized in that the encoding is suitable for supplying from its output a time-division multiplex encoded signal in which during a first field period a first linear combination of the luminance information components of two consecutive lines of a first field of the signal from the signal source and of the luminance information of two consecutive lines of a subsequent, second field of said signal which on display substantially coincide with said lines of the first field, is present, whereby in the subsequent, second field period of the time-division multiplex encoded signal a second linear combination of said luminance information components, which deviates from the first linear combination is present, the time ratio for signal compression or expansion, respectively of the first linear combination differing from the corresponding ratio of the second linear combination, the ratio defining the ratio between the time durations of a luminance information prior to and after a change in the duration.

Because of the measure according to the invention a relatively small ratio can be chosen for one of the time ratios. This time ratio is the inverse of the abovementioned factor. If this ratio is equal to 1:1, no signal compression and neither signal expansion occur, while a ratio exceeding 1:1 implies signal compression. If a ratio of about 1:1 is opted for, then during the relevant field little or no transmission time is used for transmitting chrominance information, so that the plurality of luminance picture elements transmitted is large. The luminance information has a good resolution, given the fact that a large time ratio, so a considerable time compression, implies a frequency band limitation because of the limited channel capacity. Consequently, the bandwidth of the transmission of information storage channel, respectively is utilized to an improved extent for the picture quality on display of the transmitted or stored luminance information. During the other field of the time-division multiplex encoded signal the number of transmitted luminance picture elements is less than is the case in the first field, and the resolution is not so good. Compared with the MAC-system, in which the luminance information is compressed in both fields to an equal extent, the measure according to the invention improves the resolution in the horizontal direction, both for interlaced fields and for non-interlaced fields. The resolution in the vertical direction is determined by the number of lines per field and is consequently not affected by the measure according to the invention, although a slight loss in resolution is indeed observed in diagonal directions.

Preferably, the system in accordance with the invention is characterized in that the time ratio for signal compression or expansion, respectively of the first linear combination is not more than equal to 1:1, while the corresponding ratio of the second linear combination exceeds 1:1. If a portion of the line blanking interval in the time-division multiplex encoded signal is utilized for transmitting a portion of the first linear combination, then the time ratio may have a value less than 1:1, that is to say signal expansion is effected, which results in a still better resolution.

In accordance with a simplification, the color television system according to the invention, is characterized in that no chrominance information is present in the supplied time-division multiplex encoded signal during the line periods of the first field period in which the first linear combination is present.

An interesting variant is a variant in which the first linear combination contains only the luminance information of one line in the first field of the signal from the signal source. In that case the color television system may be characterized in that the second linear combination is equal to the difference between the luminance information of a line in the second field of the signal from the signal source and the luminance information of a line in the second field of said signal which, on display, substantially coincides with said line in the second field.

A data generator suitable for use in a color television system according to the invention, the encoding circuit comprising a time-division multiplex circuit for receiving the luminance and chrominance information from the signal source and for generating the time-division multiplex encoded signal, the time-division multiplex circuit comprising a first store which is operative with different write and read rates for processing the chrominance information and a second store which is operative for processing the luminance information, is characterized in that the time-division multiplex circuit comprises a switching stage which is controllable by a change-over signal of the picture frequency, for obtaining a picture-frequency change of the time-ratio for signal compression or expansion, respectively of the luminance information.

A data receiver suitable for use in a color television system according to the invention, in association with such a data generator, the decoding circuit for the time decompression of the chrominance information incorporating stores operating with different write and read rates, the stores for the time-division multiplex decoding being writable in different time durations, is characterized in that the decoding circuit further includes a delay element and a switching stage controllable by a change-over signal of the picture frequency for processing the received luminance information, the delay element producing a delay of an integral number of line periods and substantially one field period, the delayed and the non-delayed signal alternately substantially supplying the first and second linear combinations.

Preferably, such a data receiver is characterized in that the decoding circuit further includes an adder stage for adding the higher frequency components of the received luminance signal containing the first linear combination to the received luminance signal containing the second linear combination, the signals to be added being derived field-sequentially from the input and output signals of the delay element. Using this measure prevents annoying flicker.

BRIEF DESCRIPTION OF THE DRAWINGS

The invention will now be described in greater detail by way of example with reference to the accompanying Figures, wherein.

DETAILED DESCRIPTION OF THE INVENTION

Figure 1:
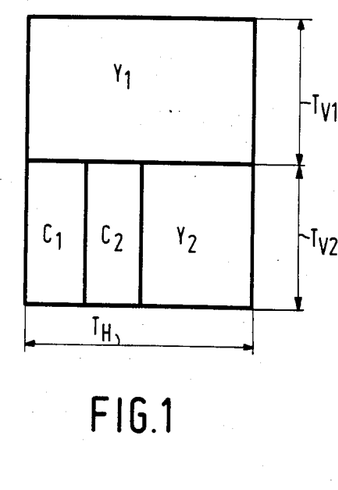
FIG. 1 shows schematically the structure of a color television signal transmitted in the color television system in accordance with the invention.

FIG. 1 shows schematically the structure of a color television signal. Viewed from top to bottom, a picture period comprising two field periods $T_{V1}$ and $T_{V2}$ is shown, and a line period $T_H$ is plotted from left to right. For the European television standard, for example, a field period of 20 ms holds, which corresponds to a field frequency of 50 Hz, while the line period has a duration of 64 μs, corresponding to a line frequency of 15.625 kHz. For the sake of simplicity, the line blanking period and the field blanking period are not shown, that is to say the periods at the beginning of each line or field, respectively in which no picture information is transmitted, which periods must be assumed to be located in FIG. 1 at the left hand side and between the respective periods $T_{V1}$ and $T_{V2}$, respectively. In FIG. 1 $Y_1$ and $Y_2$, respectively denote a signal area containing luminance information, whereas chrominance information is designated by the information components $C_1$ and $C_2$.

FIG. 1 shows that the first field period $T_{V1}$ only contains a signal area $Y_1$ with luminance information, which information is not subjected to time compression. In contrast therewith, the second field period $T_{V2}$ contains compressed chrominance information and compressed luminance information. In each line the component $C_1$ is first transmitted during one fourth of the period, whereafter the component $C_2$ is transmitted during the subsequent one fourth part. The luminance information $Y_2$ is transmitted during the second half of the line period. This proves that for both components $C_1$ and component $C_2$ the time ratio for signal compression is 4:1, while for the luminance information $Y_2$ the corresponding ratio is 2:1. In the first field, where no time compression is effected, the ratio is equal to 1:1. In this situation the overall bandwidth for information $Y_1$ is fully utilized. Compared with the first field, the number of picture elements to be transmitted for the luminance information is halved in the second field because of the time compression. If, in addition, during the first field a portion of the line blanking period is used for transmitting information $Y_1$, then said ratio, which indicates the ratio between the time durations of the information prior to and after a time change is effected, is less than 1:1. Compared to the signal before to the time-division multiplex encoding was effected, time expansion is effected, said ratio having a value of between 0.8:1 and 1:1, i.e. an improvement by a factor up to 1.25 for the bandwidth after decoding.

Figure 2:
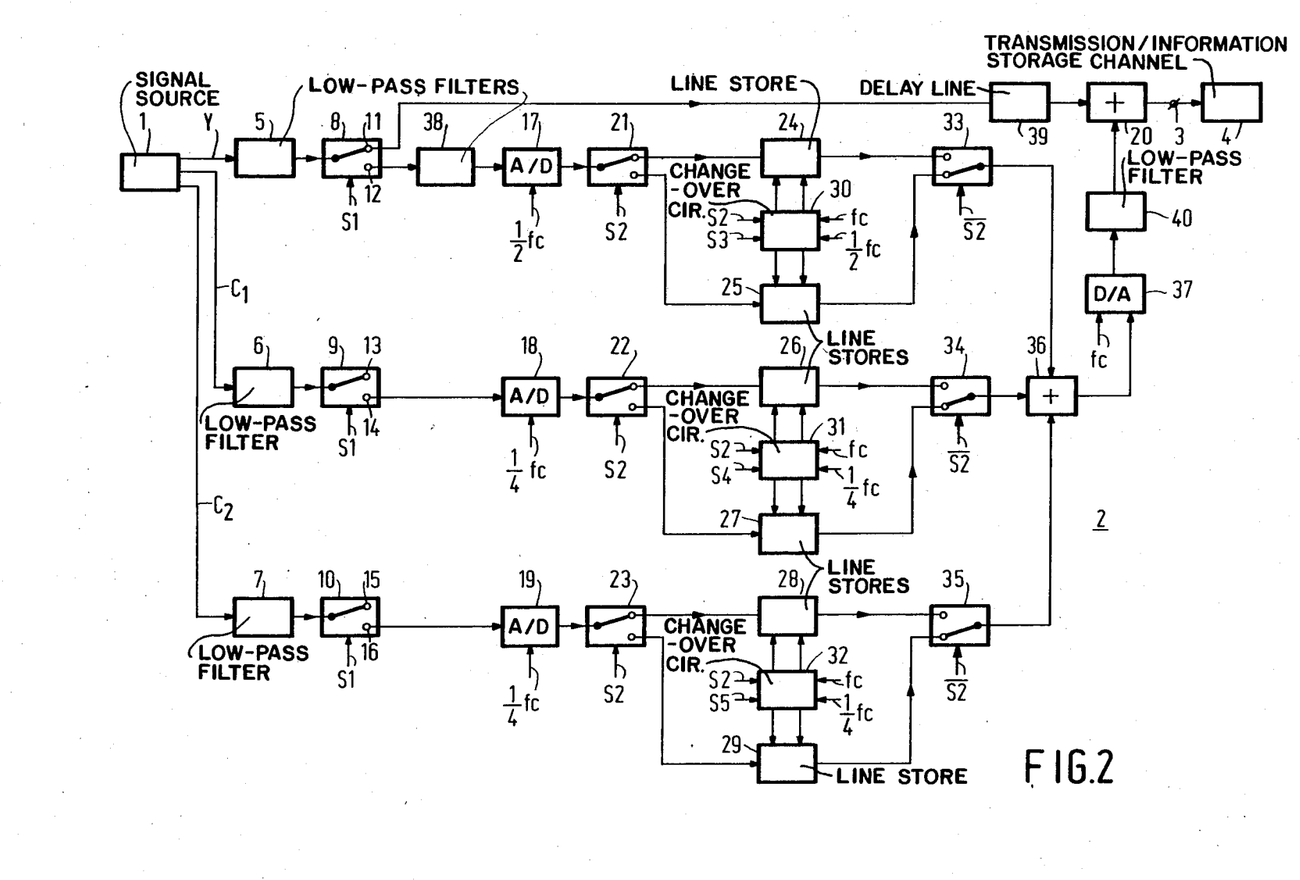
FIG. 2 is a block diagram of an embodiment of a data generator suitable for producing a signal as shown in FIG. 1.

In the block diagram of a color television data generator, as shown in FIG. 2, reference numeral 1 denotes a signal source for producing the signal of FIG. 1. Signal source 1 is connected to a coding circuit 2, an output 3 of which is connected as an output of the data generator to a transmission or information storage channel 4, respectively. When used as a transmission channel, channel 4 may, for example, be in the form of a satellite link, a terrestrial transmission channel or a cable connection. When used as an information storage channel, channel 4 may comprise information storage and display equipment, such as, for example, tape and/or record pick-up and display devices. The specific construction of channel 4 is not relevant to the invention.

In FIG. 2 it is shown that the data source 1 produces the information Y, $C_1$ and $C_2$. When source 1 is in the form of a color television camera, Y represents a luminance information component and $C_1$ and $C_2$ represent chrominance-information components. In the NTSC television standard, $C_1$ and $C_2$ are the standardized chrominance information components I and Q. In the PAL-standard $C_1$ and $C_2$ are the components U and V.

Encoding circuit 2 comprises three low-pass filters 5, 6 and 7 to which the respective information components Y, $C_1$ and $C_2$ are applied. For cut-off frequency of filter 5 is, for example, the cut-off frequency of the bandwidth allocated to color television for channel 4, while the cut-off frequencies of filter 6 and 7 may be lower. These filters are followed by the respective switching stages 8, 9 and 10, which all receive the same change-over signal S1. Under the control of change-over signal S1, the input signal of stage 8 is available at either an output 11 or at an output 12. Similarly, the input signal of stage 9 is available at either an output 13 or an output 14, whereas the input signal of stage 10 is available at either an output 15, or an output 16. Outputs 12, 14 and 16 are connected to respective analog-to-digital converters 17, 18 and 19, to which clock pulses are applied, to converter 17 with a clock pulse frequency ½ fc and to the converters 18 and 19 with a clock pulse frequency ¼ fc. Herein fc is equal to, for example, 20.25 MHz.

Change-over signal S1 has the picture frequency, i.e. half the field frequency, and is a symmetrical square-wave. During a field period the respective input signals of change-over stages 8, 9 and 10 are applied to the respective outputs 11, 13 and 15. Output 11 is connected to an input of an adder stage 20, while outputs 13 and 15 remain unconnected. During the subsequent field period of respective input signals of switching stages 8, 9 and 10 are applied to the outputs 12, 14 and 16, respectively and consequently to the respective converters 17, 18 and 19. These converters are followed by respective switching stages 21, 22 and 23, which all receive the same change-over signal S2. Under the control of signal S2 the digital information Y of converter 17 is applied to either a line store 24, or a line store 25. Similarly, the digital information $C_1$ of converter 18 is applied to either a line store 26, or a line store 27, while the digital information $C_2$ of converter 19 is applied to either a line store 28, or a line store 29. Line stores 24 to 29 are in the form of digital memories whose storage capacity is sufficient for storing the information of one television line and which are of a type having different write and read rates.

Clock pulse signals are applied at the clock pulse frequencies fc and ½ fc to the stores 24 and 25 via a multiplex circuit which is in the form of a changeover circuit 30. To effect the change-over action, two change-over signals S2 and S3 are applied to circuit 30, the clock pulse signal having frequency ½ fc being applied under the control of signal S2 and the clock pulse signal having frequency fc being applied under the control of signal S3. Signal S2 is a square-wave signal of half the line frequency. During a line period, the digital information Y of converter 17 is entered into store 24 with the clock pulse frequency ½ fc and during the subsequent line period the digital information Y is entered into store 25 with the same clock pulse frequency. Each of the outputs of stores 24 and 25 are connected to an input of a switching stage 33, which is controlled by a change-over signal $\overline{S2}$. Compared to signal S2, signal $\overline{S2}$ has the same frequency and the opposite polarity. Signal S3 has the line frequency and a certain pulse level during the first half of a line period and a different pulse level during the second half of the same line period. During the second half of a line period in which signals are entered into store 25, store 24 is read at the clock pulse frequency fc and during the second half of the line period subsequent thereto, in which signals are entered into store 24, store 25 is read with the same frequency fc. Since the read rate is twice the write rate, stores 24 and 25 effect a time compression with a time ratio for signal compression equal to 2:1. Switching stage 33 is connected to an input of an adder stage 36. During the period of time in which converter 17 and store 24 are interconnected via switching stage 21, store 25 and adder stage 36 are interconnected via a switching stage 33 and in the period of time in which the converter 17 and the store 25 are interconnected via switching stage 21, store 24 and adder stage 36 are interconnected via switching stage 33. The time-compressed luminance information is consequently always conveyed to adder stage 36. A low-pass filter 38 is included between stage 8 and converter 17, as a result of which the occurrence of aliasing components is prevented.

In a similar way as described above, encoding circuit 2 comprises a change-over circuit 31 for applying to the stores 26 and 27 clock pulse signals having the clock pulses frequencies fc and ¼ fc under the control of change-over signals S2 and S4 and a change-over circuit 32 for applying to the stores 28 and 29 clock pulse signals also having the clock pulse frequencies fc and ¼ fc under the control of change-over signals S2 and S5. Outputs of stores 26 and 27 are each connected to an input of a switching stage 34, which is controlled by the change-over signal $\overline{S2}$ and is connected to a second input of adder stage 36. Outputs of stores 28 and 29 are each connected to an input of a switching stage 35, which is controlled to a third input of adder stage 36. In this situation, the signals S4 and S5 have the line frequency and during the first and second foruth portion, respectively of a line period they have a certain pulse level and a different pulse level during the remainder of the same line period. During a line period in which the digital information Y of converter 17 is entered into store 24 the digital information $C_1$ is entered into store 26 at the clock pulse frequency ¼ fc, while the digital information $C_2$ is entered into store 28 at the same clock pulse frequency. The time-compressed information $C_1$ from store 26 is conveyed to adder stage 36 during the first fourth part of the subsequent line period; during the subsequent fourth part of the line period the time-compressed information $C_2$ from store 28 is conveyed to adder stage 36 and during the subsequent second half of the line period the time-compressed information Y is conveyed to adder stage 36. During the time said signals are conveyed, the stores 24, 26 and 28 are written-in.

The foregoing applies to a predetermined field period in which the master contact of switching stage 8 is connected to output 12, whereas the master contact of switching stage 9 is connected to output 14 and the master contact of switching stage 10 to output 16. An output of adder stage 36 is connected to a digital-to-analog converter 37 to which a clock pulse signal having the clock pulse frequency fc is applied and whose output signal is applied to a second input of adder stage 20 via a low-pass filter 40. During the field period subsequent to the above-described field period, the non-compressed luminance information Y is present at the first input of stage 20, while no chrominance information is present. An output of adder stage 20 is connected to the output 3 of encoding circuit 2. Let it be assumed that channel 4 is suitable for analog signal processing. If channel 4 is suitable for transmission or storage of digital information, converter 37 may be omitted, while instead of the output of stage 8 the output of converter 17 is connected to stage 20. A delay line 39 is included between stage 8 and stage 20 for compensating for the delays caused by the compression in the channels for the signals $Y_2$, $C_1$ and $C_2$.

FIG. 2 shows an embodiment of a data receiver which receives the signal for channel 4 at an input 42 of a decoding circuit 41. The operation of this decoding circuit is basically complementary to that of the encoding circuit 2 of FIG. 2, that is to say at outputs 43, 44 and 45, respectively of decoding circuit 41 a luminance information Y and chrominance information components $C_1$ and $C_2$, respectively occur which correspond to the best possible extent to the portions of information components Y, $C_1$, $C_2$ processed in encoding circuit 2.

Figure 3:
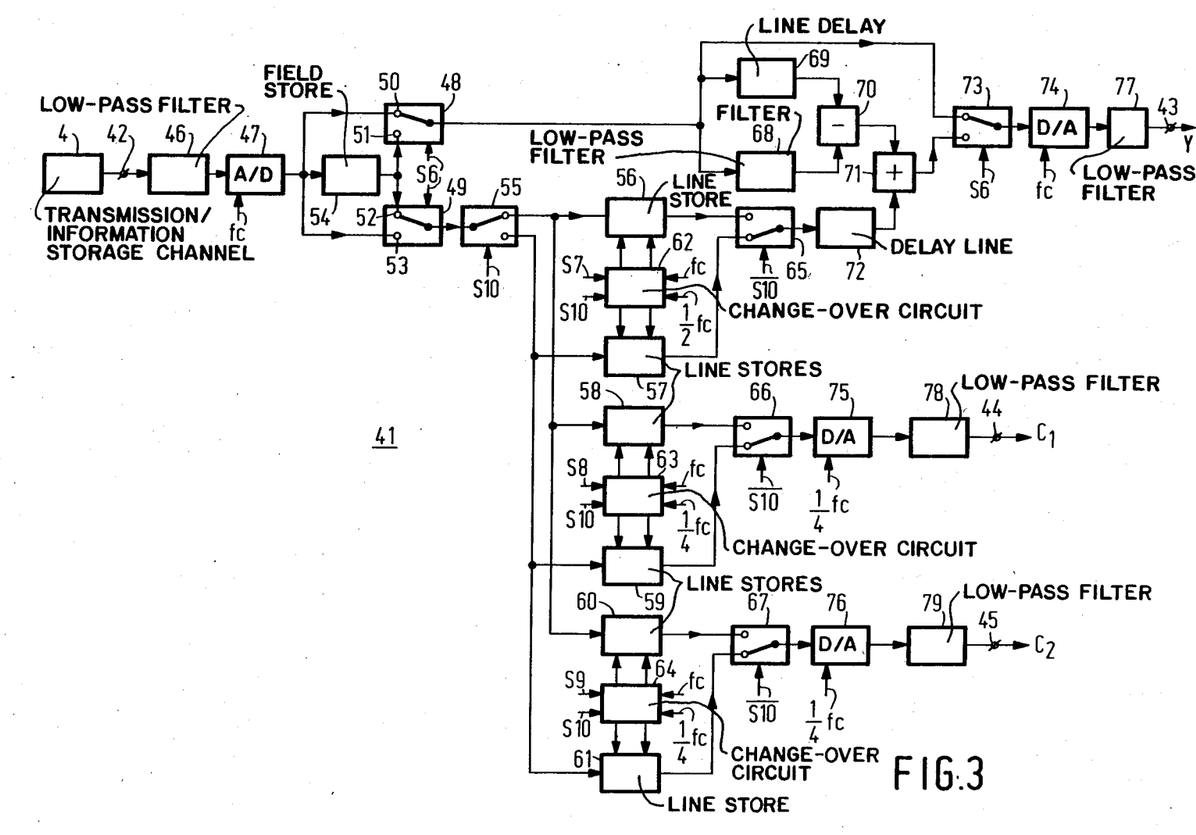
FIG. 3 is a block diagram of an embodiment of a data receiver suitable for receiving a signal of FIG. 1.

In the decoding circuit 41 the input 42 is connected to the input of a low-pass filter 46. The output of filter 46 is connected via an analog-to-digital converter 47, to which a clock pulse signal having the frequency fc is applied, to a selection contact 50 of a switching stage 48 controlled by a change-over signal S6, to a selection contact 53 of a switching stage 49 controlled by the change-over signal S6 and to an input of a field delay element in the form of a field store, which store is a digital memory having a sufficient storage capacity for storing the information of one television field. This produces a delay equal to one field period. This applied to a non-interlaced system. For an interlaced system the delay must be substantially equal to a field peiod and must be equal to an integral number of line periods, for example 312 line periods in the case of the European standard having 312½ line periods per field. Signal S6 has a symmetrical square-wave shape and the picture frequency. During a field period, the non-delayed signal of converter 47 is available at the master contact of stage 48, while the one field period-delayed signal, consequently the signal of the previous field, is available at the master contact of stage 49. During the subsequent field period the delayed signal is conveyed by stage 48 and the non-delayed signal by stage 49.

The master contact of switching stage 49 is connected to the master contact of a switching stage 55, which is controlled by a signal S10 of a symmetrical square-wave shape and has half the line frequency. An output of stage 55 is connected to the respective inputs of three line stores 56, 58 and 60 and the other output is connected to respective inputs of three line stores 57, 59 and 61. Clock pulse signals having the clock pulse frequencies fc and ½ fc are applied to the line stores 56 and 57 by a multiplex circuit in the form of a change-over circuit 62. To effect the change-over, circuit 62 receive two change-over signals S7 and S10. The clock pulse signal having the frequency fc being applied under the control of signal S7 and the clock pulse signal having the frequency ½ fc under the control of signal S10. Signal S7 has the line frequency and during the first half of a line period a certain pulse level and a different pulse level during the second half of the same line period. During the second half of a line period the signal received at input 42 contains a time-compressed luminance information. This information is entered into store 56 at the clock pulse frequency and, during the subsequent line period, this information is entered into store 57 at the same clock pulse frequency. Outputs of stores 56 and 57 are each connected to an input of a switching stage 65, which is controlled by a changeover signal S10. Compared to signal S10, signal $\overline{S10}$ has the same frequency and the opposite polarity. During the line period in which store 57 is written, the memory 56 is read at the clock pulse frequency $\frac{1}{2}$ fc and during the subsequent line period, in which store 56 is written, store 57 is read with the same frequency. Since the read rate is half the write rate, the stores 56 and 57 effect a time decompression, that is to say a time expansion, with a time ratio for signal expansion equal to a 0.5:1. In these circumstances the signal at the master contact of stage 48 corresponds to the luminance signal $Y_1$ generated by the signal source 1 of FIG. 2 during the first field, whereas the output signal of stage 65 corresponds to the luminance signal $Y_2$ generated by source 1 during the second field. It is however a prerequisite that change-over signal S6 has the appropriate polarity, as otherwise signals $Y_1$ and $Y_2$ would be interchanged. For this purpose an identification signal can be used which is transmitted by the data generator. This may be the composite synchronizing signal.

The signal at the master contact of stage 48 is applied to a low-pass filter 68 and to a delay line 69. Thereafter, the output signal of delay line 69 is subtracted with the aid of a subtracting stage 70 from the output signal of filter 68 and the resultant difference signal is applied to a first input of an adder stage 71. The signal at the output of stage 65 is applied to a delay line 72, an output of which is connected to a second input of adder stage 71. In this situation the delays produced by the respective delay lines 69 and 72 are chosen such that corresponding signal portions are present substantially simultaneously at the inputs of stages 70 and 71, respectively. The luminance signal at the output of stage 48 has the largest possible bandwidth, while filter 68 is of such a structure that its output signal has a width equal to half the maximum bandwidth. Consequently, the signal at the output of subtracting stage 70 contains only the higher frequency components of the luminance information $Y_1$. The luminance signal at the output of stage 65 whose bandwidth, because of the time compression is half the bandwidth of the signal at the output of stage 48 does not contain said components. Consequently at an output of adder stage 71 there is a signal which corresponds to the luminance signal $Y_2$ of the second field of FIG. 1 containing the higher frequency components of the luminance signal $Y_1$ of the first field, these components in the majority of cases deviating only little from the corresponding components of the second field which were suppressed by the time compression.

The signal at the output of adder stage 71 and also the signal at the output of stage 48 are each applied to an input of a switching stage 73 which, under the control of change-over signal S6 makes, via a digital-to-analog converter 74 to which a clock pulse signal having frequency fc is applied, and a low-pass filter 77 these signals alternately available at the output 43 of decoding circuit 41 for the luminance information. From the foregoing it will be seen that the signal at output 43 corresponds appropriately to either the luminance signal $Y_1$ or to the luminance signal $Y_2$ having the higher frequency components of signal $Y_1$. Thus, a luminance information containing higher frequency components is present at the receiver side for each field, so that no picture-frequency flicker is produced.

Clock pulse signals having the clock pulse frequencies fc and $\frac{1}{4}$ fc are applied to stores 58 and 59 via a change-over circuit 63. For effecting the change-over action circuit 63 receives two change-over signals S8 and S10, the clock pulse signal having frequency fc being applied under the control of signal S8 and the clock pulse signal having frequency $\frac{1}{4}$ fc being applied under the control of signal S10. Signal S8 has the line frequency and during the first fourth part of a line period has a certain pulse level and a different pulse level during the remainder of this line period. During the first fourth part of a line period the signal present at the output of stage 49 contains a time-compressed chrominance information component $C_1$. This information is entered into store 58 at the clock pulse frequency fc and, during the subsequent line period, this information is entered into store 59 at the same clock pulse frequency. Outputs of stores 58 and 59 are each connected to an input of a switching stage 66, which is controlled by change-over signal $\overline{S10}$. During the line period in which store 59 is written-in, store 58 is read at the clock pulse frequency $\frac{1}{4}$ fc and, during the subsequent line period, in which store 58 is written-in, store 59 is read at the same frequency. A time-decompression is effected by means of stores 58 and 59 with a time-ratio for signal expansion equal to 0.25:1.

Similarly, clock pulse signals having the clock pulse frequences fc and $\frac{1}{4}$ fc are applied to stores 60 and 61 via a change-over circuit 64, said first signal being applied under the control of a change-over signal S9 and the second signal under the control of the change-over signal S10. During the second fourth part of a line period signal S9 has a certain pulse level and a different pulse level during the remainder of the period. Outputs of stores 60 and 61 are each connected to an input of a switching stage 67, which is controlled by change-over signal $\overline{S10}$.

In these circumstances the output signals of stages 66 and 67 correspond to the respective chrominance information components $C_1$ and $C_2$ generated during the second field by the signal source 1 of FIG. 2. During the first field no chrominance information is conveyed but, thanks to field store 54, the chrominance information of the preceding second field is available during the first field at the outputs of stages 66 and 67. As a rule this information deviates only little from the non-transmitted chrominance information. The output of stages 66 and 67, respectively are connected to the outputs 44 and 45, respectively of decoding circuit 41 via a digital-to-analog converter 75 and 76, respectively, to which a clock pulse signal having the frequency $\frac{1}{4}$ fc is applied. If necessary, compensating delay elements may be included between the respective filters 77, 78 and 79 and the respective outputs 43, 44 and 45.

It will be obvious that a still better resolution can be obtained with the described television system if the two fields forming a picture are transmitted interlaced in a conventional way. It should be noted that a data receiver in which the chrominance information is not repeated, as is the case for the receiver of FIG. 3 with the aid of field store 54, and consequently only the higher frequency components of the luminance information being repeated, results in a picture quality which is still acceptable. It is then however a prerequisite that the field frequency is high enough to prevent picture-frequency flickering of the color information from becoming visible. Similarly, it is not essential to the invention that the higher frequency components of the luminance information be repeated. If they are not repeated then field store 54 may be omitted. The intensity of the high-frequency details then becomes less, but can be compensated for with the aid of high-pass filters.

Figure 4:
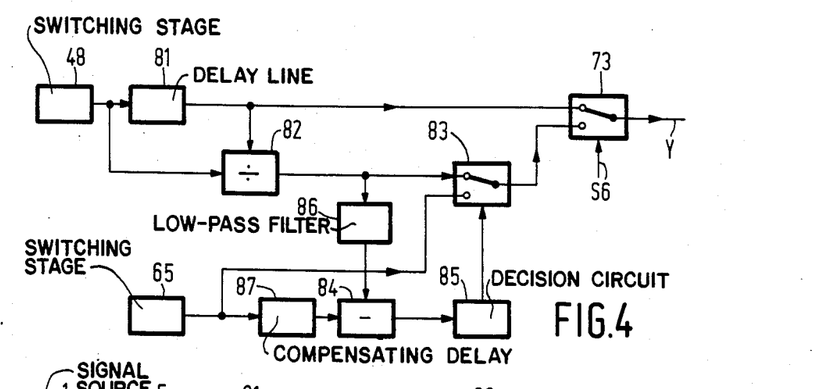
FIG. 4 is a modification of the receiver as shown in FIG. 3.

A refinement of the data receiver of FIG. 3 is shown in FIG. 4, which only shows the relevant portion of the receiver. In the embodiment of FIG. 4 the output signal of switching stage 48 is applied to a delay line 31 and to the stage 82. Delay line 81 is a component producing a delay of one line period. Its output signal is also applied to a stage 82 by means of which half the sum of the input signals of stage 82 is determined. For each picture element the signal obtained is half the sum of the corresponding luminance information components of two consecutive lines of the first field of FIG. 1. This interpolated luminance signal and also the decompressed signal at the output of stage 65 are applied to a selection circuit 83 which is operated by means of a decision circuit 85. The interpolated signal and the decompressed signal are also applied to a subtracting stage 84 to determine the difference between its input signals, the interpolated signal passing first through a low-pass filter 86 and the decompressed signal first passing through a compensating delay element 87. Using the subtracting stage 84 the lower frequency components of the interpolated signal are compared with the corresponding components of the decompressed signal as this decompressed signal does not contain high-frequency components. The difference indicates there is movement or a vertical detail. In that case, by means of decision circuit 85 which may be a bistable element, the selection circuit 83 is set to the state in which the decompressed signal is conveyed to switching stage 73. Circuit 85 changes to the state in which the decompressed signal is conveyed when the difference signal of stage 84 exceeds a predetermined value, with the object of preventing noise in the signal from resulting in the choice of the decompressed signal. If no difference is detected by stage 84, that is to say no movement or a vertical detail are detected, or if the difference stays below the threshold of circuit 85, then the interpolated signal is applied to a stage 73. Under the control of change-over signal S6, which has the picture frequency, stage 73 conveys either the output signal of delay line 81, or the signal conveyed by selection circuit 83. From the foregoing it will be obvious that in picture portions in which there is movement or a vertical detail, the luminance signal of the second field is displayed, while for the other picture portions the signal with the high resolution of the first field is displayed.

In the foregoing the color television system which is schematically shown in FIG. 1 is described in great detail, it being a system in which the time ratios for signal compression or expansion, respectively of the luminance information in both fields of the picture are different. It will be obvious that other embodiments of such a system are conceivable. A variant of the system of FIG. 1 is, for example, a system in which during the first portion of the second field period $T_{V2}$ the chrominance information components $C_1$ and $C_2$ are not transmitted sequentially in the same line period, as is the case in FIG. 1, but are transmitted in alternate lines. This implies that in a given line period of field period $T_{V2}$ the component $C_1$ is transmitted, while component $C_2$ is transmitted in the line period subsequent thereto. If in this situation the chrominance information is compressed, using the same time ratio 4:1 as in FIG. 1, that is to say if this information is transmitted during the first fourth part of the line period, then the luminance information $Y_2$ can be transmitted during the remainder of the period. This implies a lower time ratio of 4/3:1 instead of 2:1. The resolution of the chrominance information is somewhat poorer than in the case of FIG. 1. It should be noted that the television signal transmitted during the second field period has the same signal structure as the known MAC-signal. It can consequently be transmitted and processed in a known manner. The data generator of FIG. 2 is then modified for transmitting such a signal during every second field and the data receiver of FIGS. 3 and 4, respectively is modified for receiving and displaying this signal during the second field.

Figure 5A:
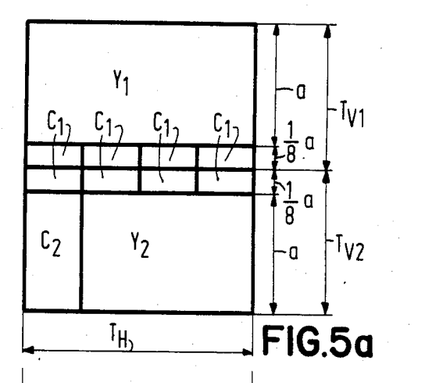
FIGS. 5a, 5b, 5c, and 6 are variants of the structure of the color television signal.

In FIG. 5 a number of variants of the color television system according to the inention is shown in a similar way as in FIG. 1. In the modification shown in FIG. 5a the luminance information $Y_1$ is transmitted non-compressed or expanded during the first a lines of the first field period $T_{V1}$ of the picture. The number a is then, for example, equal to 256. During a number of ½ a lines, in this example 32 lines, the chrominance information component $C_1$ is thereafter transmitted. These lines form a horizontal strip which is divided in four equal portions. The component $C_1$ of the first line of the field period $T_{V2}$ is compressed to one fourth part, i.e. to approximately 13 μs. of the active duration of the first line of the lines of this horizontal strip. The next 13 μs of this line contain the component $C_1$ of the second line of period $T_{V2}$, while the component $C_1$ of the third line is compressed to the subsequent 13 μs and the component $C_1$ of the first line is compressed to the last 13 μs. The duration of the line blanking period is assumed to be approximately 12 μs. Similarly, the second line of the horizontal strip comprises, one after the other, the component $C_1$ of the fifth, the sixth, the seventh and the eighth line of period $T_{V2}$. From this it is to be seen that the strip contains the information component $C_1$ of 128 lines, i.e. half the number of a lines of which the luminance information has already been transmitted.

During the first 32 lines of the second field period $T_{V2}$ of the picture following after the non-depicted field blanking interval, the chrominance information component $C_1$ of the subsequent 128 lines of period $T_{V2}$ is transmitted, and that in the same manner in the horizontal strip as was the case in the above-mentioned horizontal strip. This is followed by a horizontal strip having a height of a =256 lines. The first fourth part of each of these lines contains the chrominance information component $C_2$ of period $T_{V2}$, while during the remaining part of the line period the luminance information $Y_2$ of the same period is transmitted. In the example given here the picture is formed by 256+32=288 active lines per field period. In the embodiment shown in FIG. 5a the information $Y_1$ is in the non-compressed state, while information $Y_2$ is compressed with a time ratio 4/3:1 and while information components $C_1$ and $C_2$ are compressed with a time ratio 4:1.

A data generator for producing a signal as shown in FIG. 5a can be derived in a simple way from the above description with reference to the signal of FIG. 1, and from the description given in Applicant's Netherlands Patent Application No. 8301013 (PHN 10.628) of a data generator for producing a signal containing different types of information in a plurality of horizontal strips. The same holds for a data receiver suitable for receiving and displaying the signal of FIG. 5a. In this connection it should be noted that in the signal produced by the data generator according to said Patent Application the luminance information is not subjected to time compression.

Figure 5B:
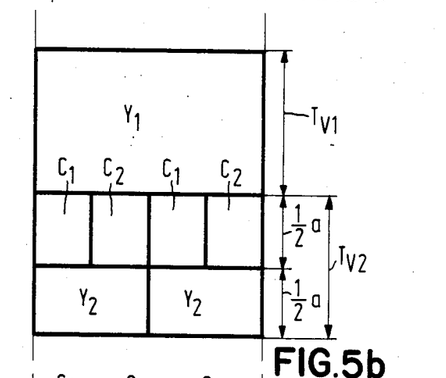

In the case of the signal shown in FIG. 5b, the first field period $TV_1$ contains only one signal area $Y_1$ with luminance information which is either not subjected to time compression or is subjected to time expansion. The second field period $TV_2$ contains a first horizontal strip with chrominance information having a height of ½a lines. The first horizontal strip comprises the chrominance information of the a lines and is divided into four equal parts in which the chrominance information components are compressed with a time ratio 4:1. The first part contains the component $C_1$ of the first half of the a lines and the second part contains the component $C_2$ of that same half, whereas the third part contains the component $C_1$ and the fourth part the component $C_2$ of the second half of the a lines. The second horizontal strip contains the luminance information of these a lines and is divided into two equal parts, the first part containing the information $Y_2$ of a first half of the a lines and the second part containing the information $Y_2$ of the second half of these lines. In this situation information $Y_2$ is subjected to time compression with a time ratio of approximately 2:1.

Figure 5C:
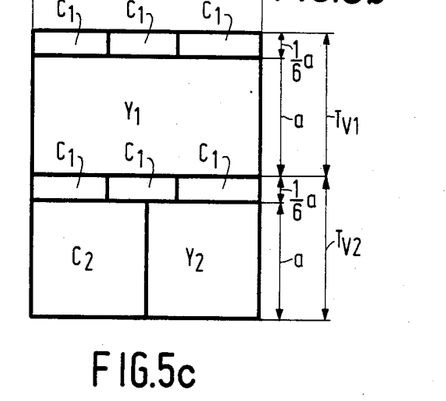

According to the variant of FIG. 5c, the first field period $T_{V1}$ again includes a signal area $Y_1$ with non-compressed or expanded luminance information, more specifically during a number of a line periods. During a number of 1/6 a line periods at the beginning of period $TV_1$ the chrominance information component $C_1$ associated with the first field is transmitted. During a first third part of the first line of the horizontal strip formed, the component $C_1$ of the first line of the field period is transmitted in the compressed state. The second portion of the first line of the horizontal strip contains the component $C_1$ of the second line of period $T_{V1}$, whilst the component $C_1$ of the third line is compressed to the last part of the first line of the horizontal strip. Consequently, the strip contains the component $C_1$ of the first half of the a lines, whereafter the a lines containing information $Y_1$ are transmitted. During a number of 1/6 a line periods at the beginning of period $T_{V2}$ the information component $C_1$ of the second half of the a lines is transmitted, more specifically in the same way as component $C_1$ of the first half one field period previously. After the horizontal strip formed there is an area with a lines. The first half of each of these lines contains the chrominance information component $C_2$ of period $T_{V1}$, while during the second half of the line period the luminance information $Y_2$ of period $T_{V2}$ is transmitted. In this example and also in the examples shown in FIGS. 5a and 5b, the horizontal strip containing the chrominance information may occur partly in the field blanking period, which has the advantage that the number of active lines is larger.

Figure 6:
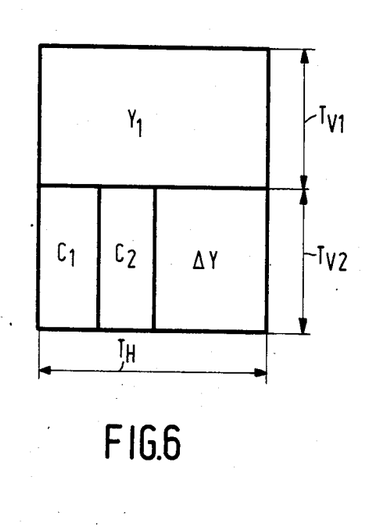

A number of variants of the television system according to the invention may still be conceived, which, as also the embodiments of FIGS. 1 and 5, may have practical advantages and disadvantages. For all these variants it is furthermore possible that the different subareas have in known manner optionally movable boundary lines. FIG. 6 shows a variant of the system of FIG. 1. This system differs from the variant shown in FIG. 1 in that in the second half of each line period of the second field period $T_{V2}$ it is not the luminance information $Y_2$ which is transmitted in the compressed state, but the difference $\Delta Y$ between the luminance information $Y_1$ of a line in the first field and the luminance information $Y_2$ of a line in the second field which on display substantially coincides with said line in the first field. In FIG. 6 the time ratio for signal compression is 4:1 for both component $C_1$ and component $C_2$, while for information $\Delta Y$ the corresponding ratio is 2:1. If for a certain picture detail the luminance information $Y_1$ of a given line is the same as the luminance information $Y_2$ of the corresponding line one field period later, than information $\Delta Y = 0$. A non-zero $\Delta Y$ indicates a transition in the vertical direction or movement. Such a transition is a low-frequency transition and is substantially not affected by the loss in resolution caused by the time compression. For this reason a time compression larger than 2:1 can be chosen for information $\Delta Y$, as a result of which there is more room in the line period for transmitting the chrominance information than was the case in FIG. 6, which results in a smaller compression and, consequently, in an improved resolution for the color. The signal of FIG. 6 has an advantage, namely the fact that on decompression of a time-compressed luminance information signal introduced at the transmitter end, an interference is introduced in the presence of a high-frequency horizontal transition. In fact, when the signal passes through a low-pass filter an oscillation is superposed on the signal which, on decompression, may be annoying, as it has a lower frequency. Such an interference is not possible for the signal $\Delta Y$ of FIG. 6.

More generally, a system can be conceived in which the following information components are transmitted:

$$\Delta_1 Y = m_1 Y_1 + n_1 Y'_1 + p_1 Y_2 + q_1 Y'_2 + r_1$$

and $$\Delta_2 Y = m_2 Y_1 + n_2 Y'_1 + p_2 Y_2 + q_2 Y'_2 + r_2,$$

wherein $\Delta_2 Y$ is compressed to a larger extent than $\Delta_1 Y$. In these formulae $Y_1$ and $Y'_1$ are the luminance information components of two consecutive lines of the first field, while $Y_2$ and $Y'_2$ are the luminance information components of two consecutive lines of the second field which, on display, coincide with the considered lines of the first field or substantially coincide therewith in the case of interlaced display. $m_1, \ldots r_2$ are optional numbers. In this way, instead of the luminance information components $Y_1$ and $Y_2$ of FIG. 1, two linear combinations of luminance information components are transmitted, each linear combination comprising information of two consecutive lines of a field and also of the subsequent field. Any desirable interpolation can be obtained by the choice of the numbers $m_1, \ldots r_2$, on the condition that the two linear combinations are different to ensure that they do not contain the same information. For the case illustrated in FIG. 1 it holds that $m_1 = p_2 = 1$, while all other parameters in the expression for $\Delta_1 Y$ and $\Delta_2 Y$ are zero. For the case illustrated in FIG. 6 it holds that $m_1 = p_2 = 1$ and $m_2 = -1$, while all other parameters are zero. A further variant is the variant for which it holds that $m_1 = p_2 = 1$ and $m_2 = n_2 = -\frac{1}{2}$, while all the other parameters are zero: the expressions for $\Delta_1 Y$ and $\Delta_2 Y$ are simplified to $$\Delta_1 Y = Y_1 \text{ and } \Delta_2 Y = Y_2 - Y_1 + y'_1/2.$$

In this case the information transmitted during the second field period is equal to the time-compressed difference between the luminance information of a line of the second field and half the sum of the luminance information components of lines of the first field which, on display, substantially coincide with the first line considered.

Figure 7:
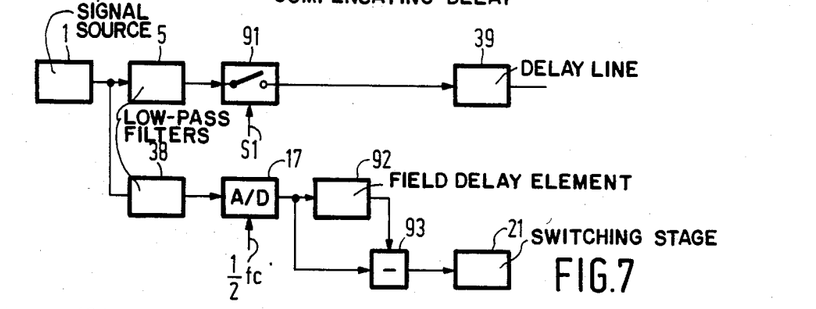
FIG. 7 shows a portion of the circuit diagram of a data generator suitable for producing a signal as shown in FIG. 6.

FIG. 7 shows a block diagram of a data generator for producing a signal as shown in FIG. 6. Compared with FIG. 2, FIG. 7 shows only the relevant portion of the data generator. The channel for processing the chrominance information component $C_1$ and the channel for processing the chrominance information component $C_2$ are not modified. In FIG. 7, the luminance information Y is applied to the two low-pass filters 5 and 38, filter 38, and also the filter with the same references in FIG. 2, limiting the frequency band by a factor of 2 compared to filter 5. Filter 5 is followed by a switch 91, which is operated by the change-over signal S1 for alternately conveying and blocking the information during a field period. The information conveyed is applied to adder stage 20 via delay line 39. Filter 38 is followed by the analog-to-digital converter 17 which operates with a clock pulse frequency of ½ fc. The output of converter 17 is connected to a field delay element 92 and to an input of a subtracting stage 93. Element 92 is a similar element as element 54 described with reference to FIG. 3. The output signal of element 92 is applied to a further input of stage 93, an output of which is connected to the master contact of switching stage 21. From the foregoing it will be obvious that the output signal of stage 93 contains the information which is equal to the difference between the luminance information components of two consecutive fields of the signal from the signal source. Thereafter the output signal ΔY of stage 93 is time-compressed using the same elements and in the same way as is signal $Y_2$ of FIG. 2, whereafter the signal obtained is added to the time-compressed chrominance signal by means of adder stage 36.

A data generator may be of such a structure that it can produce a plurality of variants of a color television signal. A plurality of selection switches are used to choose the desired variant. Such a switch allows, for example, the choice between a system with and a system without interpolation of the luminance information components of consecutive lines depending on whether an interpolator such as 92, 93 of FIG. 7 is included or not included in the Y-channel. Using a different selection switch a choice can be made between a plurality of time ratios for signal compression and expansion, respectively.

Figure 8:
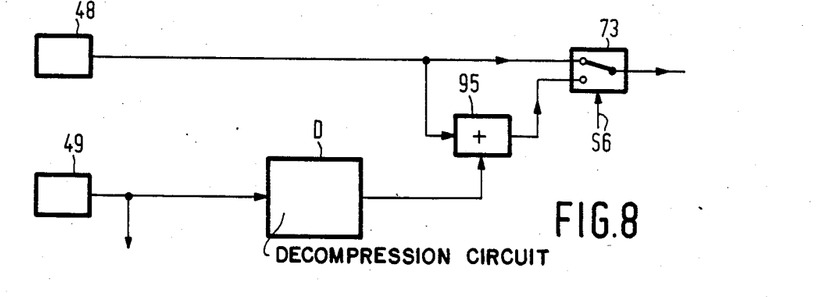
FIG. 8 illustrates a portion of the circuit diagram of a data receiver suitable for receiving a signal as shown in FIG. 6.

A data receiver which deviates only little from the generator shown in FIG. 3 receives and displays the signal produced by the data generator of FIG. 7. FIG. 8 shows some details of this data receiver. In a similar manner as in FIG. 3 the signal at the output of stage 48 contains the non-compressed luminance information $Y_1$, while the signal at the output of stage 49 contains the compressed luminance information ΔY. The first-mentioned signal is directly applied to an input of switching stage 73, while the second signal is processed in the same way as shown in FIG. 3 for obtaining information components $C_1$ and $C_2$ and is also applied to a decompression circuit D. Circuit D comprises the same elements 56, 57 and 72 as in FIG. 3 and the decompressed information Y is available at its output. The output of circuit D and the output of stage 48 are each connected to an input of an adder stage 95 an output of which is connected to the other input of switching stage 73. From the foregoing it will be obvious that a change-over action is effected between the information $Y_1$ of the first field and the information $Y_2$ of the second field, using stage 73.

In the forgoing a number of color television systems are described, in which the transmitted signal contains luminance information on the form of linear combinations of the luminance information components of two consecutive fields of the signals produced by the signal source. It will be obvious that a similar measure can also be used for the chrominance information components. In such a variant the transmitted signal contains one or both chrominance information components in the form of linear combinations in accordance with expressions similar to the expressions defined for the luminance information components. The circuit diagram of a data generator or a data receiver, respectively for such a signal can be designed on the basis of the foregoing description.

I claim:

1. Color television system, respectively with time-division multiplex coding, the system comprising at least one data generator, at least one data receiver and a transmission or information storage channel, respectively, between the generator and the receiver, the data generator.comprising at least one signal source for producing signals containing luminance, chrominance, synchronizing and identification information and an encoding circuit for time-division multiplex coding of at least a portion of said signals, which may have been subjected to a change in their time duration, the encoding circuit having an output for supplying a time-division multiplex encoded signal for transmission via the transmission channel or storage in the information storage channel, respectively, the data receiver incorporating a decoder circuit coupled to the said channel and, associated with the said encoding circuit, being suitable for producing signals comprising at least luminance and chrominance information which predominantly corresponds to the information produced by the signal source in the data generator, in the color television signal an image being formed from two or more fields having a predetermined number of lines, characterized in that the encoding circuit supplies from its output a time-division multiplex encoded signal in which during a first field period a first linear combination of the luminance information components of two consecutive lines of a first field of the signal from the signal source and of the luminance information of two consecutive lines of a subsequent, second field of the said signal which on display substantially coincide with said lines of the first field, is present, whereby in the subsequent, second field period of the time-division multiplex encoded signal a second linear combination of said luminance information components, which deviates from the first linear combination is present, the time ratio for signal compression or expansion, respectively of the first linear combination differing from the corresponding ratio of the second linear combination, the ratio defining the ratio between the time durations of a luminance information prior to and after a change in the duration.

2. A color television signal as claimed in claim 1, characterized in that the time ratio for signal compression or expansion, respectively of the first linear combination is not more than equal to 1:1, whereas the corresponding ratio of the second linear combination is larger than 1:1.

3. A color television system as claimed in claim 2, characterized in that no chrominance information is present in the supplied time-division multiplex encoded signal during the line periods of the first field period in which the first linear combination is present.

4. A color television system as claimed in any one of the preceding claims, characterized in that the first linear combination only contains the luminance information of the first field of the signal from the signal source.

5. A color television system as claimed in claim 4, characterized in that the first linear combination contains only the luminance information of one line in the first field of the signal from the signal source.

6. A color television system as claimed in any one of the claims 1-3, characterized in that the second linear combination contains the luminance information of one line in the second field from the signal source.

7. A color television system as claimed in claim 6, characterized in that the second linear combination is equal to the difference between the luminance information of one line in the second field of the signal from the signal source and half the sum of the luminance information components of two lines of the first field of said signal which, on display, substantially coincide with said line in the second field.

8. A color televsion system as claimed in claim 5, characterized in that the second linear combination is equal to the difference between the luminance information of a line in the second field of the signal from the signal source and the luminance information of a line in the first field of said signal which, on display, substantially coincides with said line in the second field.

9. A color television system as claimed in claim 5, characterized in that the second linear combination only contains luminance information of the second field of the signal from the signal source.

10. A color television system as claim in claim 9, characterized in that the second linear combination only contains the luminance information of one line in the second field of the signal from the signal source.

11. A color television system as claimed in claim 2, characterized in that during the second field period in the time-division multiplex encoded signal supplied the second linear combination is present in the time-compressed state during a portion of the line period.

12. A color television system as claimed in any one of claims 1-3 or 11, characterized in that the time-division multiplex encoded signal also contains in the first field period a first linear combination of the chrominance information components of two consecutive lines of the first field of the signal from the signal source and of the luminance information components of two consecutive lines of the second field of said signal which, on display, substantially coincide with said lines of the first field, the time-division multiplex encoded signal in the second field period also containing a second linear combination of said chrominance information components deviating from the first linear combination.

13. A data generator suitable for use in a color television system as claimed in claim 1, the encoding circuit comprising a time-division multiplex circuit for receiving the luminance and chrominance information from the signal source and for generating the time-division multiplex encoded signal, the time-division multiplex circuit comprising a first store which is operative with different write and read rates for processing the chrominance information and a second store which is operative for processing the luminance information, characterized in that the time-division multiplex circuit incorporates a switching stage which is controllable by a change-over signal of the picture frequency for obtaining a picture-frequency change of the time ratio for signal compression or expansion, respectively of the luminance information.

14. A data receiver as claimed in claim 13, characterized in that the time ratio for signal compression or expansion, respectively of the first linear combination is not more than equal to 1:1, whereas the corresponding ratio to the second linear combination is larger than 1:1, in that no chrominance information is present in the supplied time-division multiplex encoded signal during the line periods of the first field period in which the first linear combination is present, and in that the time-division multiplex circuit incorporates a further switching stage controllable by the change-over signal of the picture frequency for conveying during a field period a time-compressed chrominance information signal, while during the subsequent field period no chrominance information signal is present at the output of the encoded circuit.

15. A color television system, having a data generator as claimed in claim 13, and a data receiver suitable for use in said color television system, the decoding circuit for the time decompression of the chrominance information including stores having different write and read rates, the stores for the time-division multiplex decoding being writable in different time durations, characterized in that the decoding circuit further includes a delay element and a switching stage controllable by a change-over signal of the picture frequency for processing the received luminance information, the delay element producing a delay of an integral number of line periods and substantially one field period, the delayed and the non-delayed signals alternately substantially supplying the first and second linear combinations.

16. A data receiver as claimed in claim 15, characterized in that the decoding circuit further includes an adder stage for adding the higher frequency components of the received luminance signal containing the first linear combination to the received luminance signal containing the second linear combination, the signals to be added together being derived field-sequentially from the input and output signals of the delay element.

17. A color television system having a data generator as claimed in claim 13, and a data receiver suitable for use in said color television system, the decoding circuit for time-decompression of the chrominance information incorporating stores having different write and read rates, the stores for the time-division multiplex decoding being writable in different time periods, characterized in that the decoding circuit further incorporates a selection stage for conveying to an input of a second switching stage which is controllable by the change-over signal of the picture frequency either a signal obtained by interpolation from the luminance information signal of a line of the first field period and of the luminance information signal of the subsequent line, or the decompressed luminance information signal of a line of the second field period which substantially coincides with said lines of the first field period, the interpolated signal being conveyed by the selection stage when there is substantially no difference between the lower frequency components of the interpolated signal and the decompressed signal, the switching stage having a further input for receiving the luminance information signal of a line of the first field period and an output for making the luminance information available.

18. A color television system having a data receiver as claimed in claim 15, characterized in that the decoding circuit further incorporates an adder stage for adding together non-compressed luminance information present at an output of the switching stage and a decompressed luminance information derived from information also present at an output of the switching stage, a second switching stage which is controllable by the change-over signal of the picture frequency conveying either the decompressed luminance information, or the output signal of the adder stage.

* * * * *